United States Patent [19]

Hwo et al.

[11] Patent Number: 4,554,321

[45] Date of Patent: Nov. 19, 1985

[54] FILM COMPOSITIONS OF BUTENE POLYMERS

[75] Inventors: Charles C. Hwo, Sugarland; George B. Klingensmith; John A. Martone, both of Houston, all of Tex.

[73] Assignee: Shell Oil Company, Houston, Tex.

[21] Appl. No.: 580,318

[22] Filed: Feb. 15, 1984

Related U.S. Application Data

[63] Continuation-in-part of Ser. No. 407,375, Aug. 12, 1982, abandoned.

[51] Int. Cl.[4] .............................................. C08L 23/20
[52] U.S. Cl. ..................................................... 525/240
[58] Field of Search .......................................... 525/240

[56] References Cited

U.S. PATENT DOCUMENTS

| | | | |
|---|---|---|---|
| 3,175,999 | 3/1965 | Natta et al. | 260/93.7 |
| 3,634,551 | 1/1972 | Stancel et al. | 260/897 |
| 3,733,373 | 5/1973 | McConnell et al. | 260/897 |
| 3,808,304 | 4/1974 | Schirmer | 264/289 |
| 3,894,120 | 7/1975 | Frese et al. | 525/240 |
| 4,051,313 | 9/1977 | Luciani et al. | 528/496 |
| 4,075,290 | 2/1978 | Denzel et al. | 260/897 |
| 4,115,319 | 9/1978 | Scata et al. | 252/429 |
| 4,224,181 | 9/1980 | Langer, Jr. | 252/429 |
| 4,235,984 | 11/1980 | Shiga et al. | 526/127 |
| 4,250,287 | 2/1981 | Matlack | 526/125 |
| 4,298,722 | 11/1981 | Collette | 526/348.6 |
| 4,316,970 | 2/1982 | Hughes | 525/240 |
| 4,329,253 | 5/1982 | Goodall et al. | 252/429 |
| 4,354,004 | 10/1982 | Hughes et al. | 525/240 |

*Primary Examiner*—Carman J. Seccuro
*Attorney, Agent, or Firm*—Jennifer R. Daunis

[57] ABSTRACT

Films of low ether solubles content, satisfactory mechanical properties, and a greatly improved heat seal impact strength can be made from butene-1 polymers which are stereoregular, predominantly isotactic, thermoplastic elastomers (referred to herein as SEPB) and from blends of these polymers with conventional copolymers of butene-1 with small amounts of ethylene (PBE). Because of the low ether solubles content the films are useful for food and medical packaging.

Films of low ether solubles content, satisfactory mechanical properties, and excellent heat seal impact strength are produced from SEPB and preferably from blends of SEPB with small amounts of polypropylene and, optionally, high density polyethylene or a crystallization nucleating agent.

Mechanical properties of SEPB films are improved by addition of conventional PBE. Conversely, the heat seal impact strength of conventional PBE films is greatly improved and mechanical properties are synergistically improved by addition of minor proportions of SEPB.

10 Claims, 3 Drawing Figures

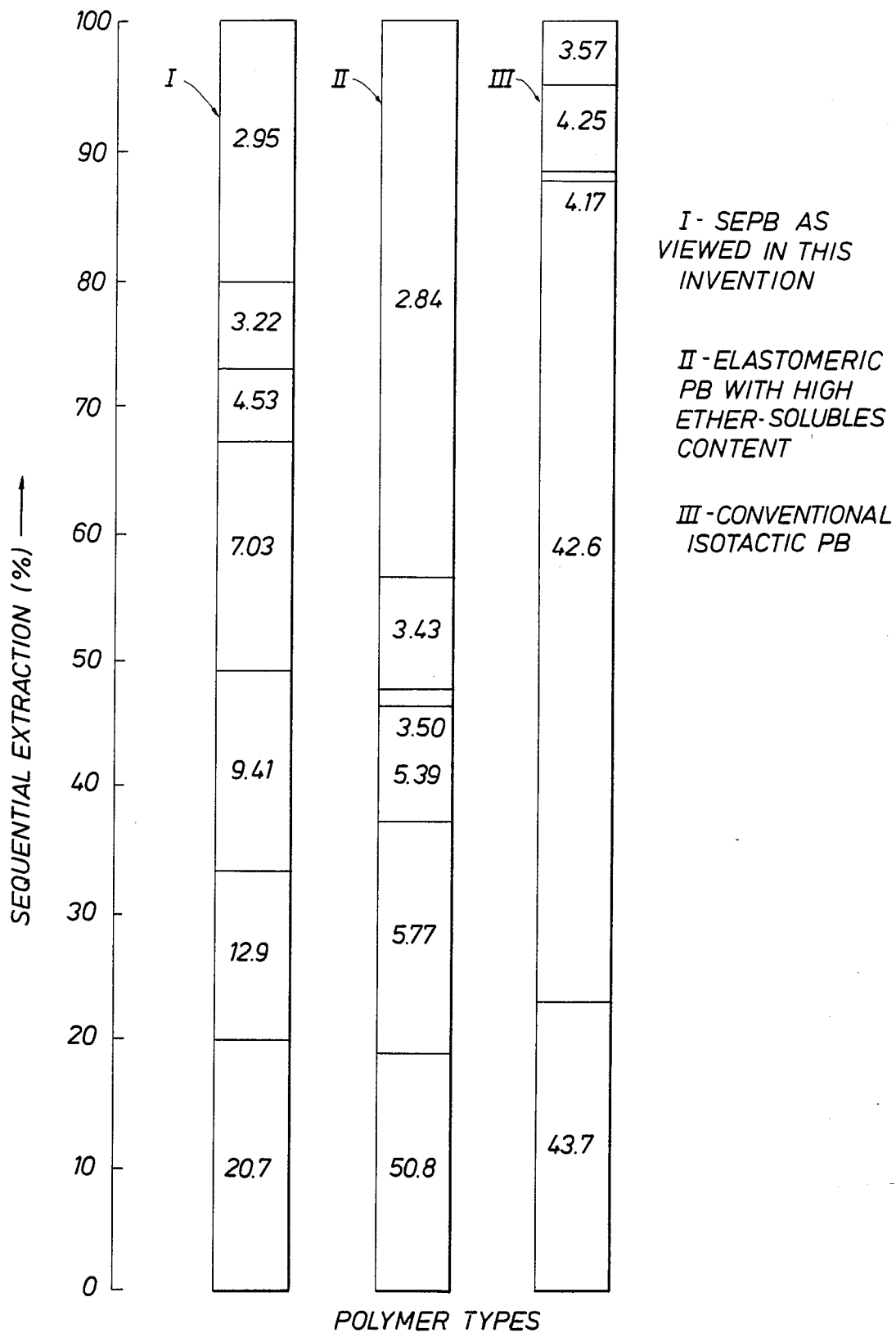
FIG.3 PERCENT SEQUENTIAL EXTRACTION

FILM COMPOSITIONS OF BUTENE POLYMERS

CROSS REFERENCE TO RELATED APPLICATION

This application is a continuation-in-part of Ser. No. 407,375, filed Aug. 12, 1982, now abandoned.

FIELD OF THE INVENTION

This invention relates to improvements in compositions for the production of film from polymers of butene-1. More particularly, the invention is directed to the production of heat-sealable films of exceptional seal impact strength from a novel stereoregular, elastomeric polymer of butene-1 and from blends of conventional butene-1-ethylene copolymers with said novel, elastomeric polybutylene.

BACKGROUND OF THE INVENTION

Films of thermoplastic polymer compositions have found many commercial uses, primarily in packaging. One large field of use of such films is in the production of medical and food packages which require certain film properties to avoid any indesirable leaching of plastic into food or the body.

A plastic film suitable for use in the fabrication of medical and food packages must possess a variety of good physical and mechanical properties. The film should be strongly resistant to tearing and exhibit good tensile strength. Clarity or transparency is another desired property. It is advantageous if heat sealing of layers of the film may be conducted over a broad range of sealing temperatures while obtaining good seal strength. To be favorable economically, the film should be readily processable at high product speeds (line speeds) and an increase in film gauge should not be required to maintain satisfactory physical and mechanical properties. Most important, the film should contain low ether solubles, and thus low extractables, to prevent undesired contamination of the saline or food, for example.

Films for use in packaging and sacking are conventionally produced by the well known blown-bubble extrusion process. The process is briefly described, for example, in "Encyclopedia of Chemical Technology"; Kirk-Othmer, 2nd Ed., 1966, Vol. 9, pp 235-236. The production of blown film from commercial film grade polybutylene resins is described in Technical Bulletin SC:391-79 of Shell Chemical Company, entitled "Processing Shell Polybutylene Film Grade Resins", published May, 1979. Conventional nomenclature frequently refers to films of greater than 10 ml thickness as sheet, although the process for producing them is called blown film extrusion, even for production of such sheets of up to 40 mil thickness.

In current commercial practice, low density polyethylene (LDPE) in the form of biaxially oriented films is the most widely used material for the production of packaging containers. However, LDPE film has relatively low tear strength and too high an ether solubles content. Isotatic poly-1-butene and its copolymers with small amounts of other monomers, commonly referred to as polybutylene homopolymers and copolymers, are superior to LDPE in respect to tear strength and ether solubles. This makes is possible to produce article of a given strength suitable for medical and food packaging from films of significantly lower gauge when using polybutylene rather than LDPE.

Copolymers of butene-1 with small amounts of ethylene, hereafter referred to as conventional butene-1-ethylene copolymers or conventional PBE, are products of commerce which have been employed for production of film by the blown-bubble extrusion process. However, heat seals between layers of unmodified and uncompounded conventional butene-1 polymers such as PBE have an unsatisfactory seal strength. Incorporating 1 to 5 percent of LDPE into conventional polybutylene, as disclosed in U.S. Pat. No. 3,634,551, improves heat seal strength somewhat. However, blends of butene-1 polymers and LDPE form films which can only be heat sealed over a relatively narrow range of temperatures and do not possess adequately low levels of extractables.

It has been found that the balance of properties of films made from conventional butene-1-ethylene copolymer can be improved by making them from a blend of PBE with about 2 to 9% by weight of polypropylene (PP). Such films have improved heat sealing properties, as well as quite low ether solubles content. A further improvement, resulting in improved processing properties, is provided by incorporating a small amount, about 0.05 to 1.5% by weight, of high density polyethylene (HDPE) in the PBE-PP composition. These improvements are disclosed and claimed in U.S. Pat. Nos. 4,316,970 and 4,354,004, respectively. A novel, stereoregular, elastomeric polybutylene is described in co-assigned co-pending U.S. Ser. No. 369,388, filed Apr. 19, 1982.

SUMMARY OF THE INVENTION

The improved compositions of U.S. Pat. Nos. 4,316,970 and 4,354,004 are still inferior in heat sealing properties as well as ether soluble content to commercial polyethylene films. We have now found that films of satisfactory mechanical properties, greatly improved heat seal impact strength, as well low ether soluble (extractables) content, can be made from novel butene-1 polymers which are stereoregular, predominantly isotactic, thermoplastic elastomers and from blends of these polymers with conventional PBE. Such stereoregular elastomeric butene-1 homopolymers are described and claimed in co-pending application Ser. No. 369,388. Similar thermoplastic elastomers may also be made as copolymers of butene-1 with small proportions of co-monomers. The stereoregular, elastomeric polybutylenes are referred to herein as SEPB, and are illustrated below:

| R R R I I R R R I I I R R R | I I I |
|---|---|
| Stereoregular | Stereoirregular |

Here, the atactic irregular polymers are anchored in the isotactic polymers so that the atactic irregular polymers are not accessible to extraction (Soxhlet extraction with diethyl ether). Thus, the ether solubles (and extractables, by definition) content is lower than that obtained from other compositions. The atactic and isotactic polymers are covalently bonded which results in ether solubles of a sufficiently low value so as to make the polymer composition and film suitable for containment of medical fluids and food. In addition, the finished medical or food package exhibits less tackiness than compositions and packages of higher ether soluble content. This polymer is referred to as Polymer I in the bar graph of FIG. 3 of this application.

According to this invention, films of moderate mechanical properties, but excellent heat seal impact strength and low ether solubles are produced from SEPB (preferably from blends of SEPB with small amounts of polypropylene) and, optionally, high density polyethylene or a crystallization nucleating agent.

Mechanical properties of SEPB films are improved by addition of conventional PBE. Conversely, the heat seal impact strength and ether soluble content of conventional PBE films is greatly improved by addition of minor proportions of SEPB.

Surprisingly, blends of up to 50% SEPB in PBE appear to be synergistic with respect to mechanical properties in that properties such as tear strength and tensile strength exceed these values for comparably prepared films of either PBE or SEPB, with peaks of improved properties being exhibited by blends of about 20% by weight SEPB in PBE, in blends which also contain small amounts of polypropylene and high density polyethylene.

Accordingly, this invention comprises compositions which are blends of SEPB and conventional PBE, optionally with small amounts of polypropylene and HDPE or crystallization nucleating agents, as well as films made from such blends, and particularly oriented films made by the blown-bubble extrusion process. It also comprises films made from SEPB containing a small amount of polypropylene and, optionally, HDPE or a crystal nucleating agent.

RELATED ART

U.S. Pat. No. 3,634,551 to Stancell et al discloses that incorporating 1–5 weight percent low density polyethylene into conventional butene-1 homopolymer significantly increases the heat seal strength of resulting films. Addition of polypropylene is referred to by mention, as prior art, of the Canadian equivalent of the parent application of U.S. Pat. No. 3,808,304.

U.S. Pat. No. 3,808,304 to Schirmer discloses heat sealable blends of conventional butene-1 homopolymer with polypropylene. Maximum seal strengths are obtained at polypropylene levels ranging from about 20–80% by weight.

U.S. Pat. No. 4,075,290 to Denzel et al discloses heat sealable blends of 80–99% by weight of conventional polybutylene and 1–20% by weight of polypropylene.

U.S. Pat. No. 3,733,373 to McConnell et al discloses that addition of 0.1–30% by weight of high or medium density polyethylene substantially increases the crystallization temperature of conventional poly-1-butene and permits blends to mold extremely well and to be released from the mold without being punctured or dented by the knock-out pins.

Stereoregular elastomeric homopolymers of butene-1 are the subject of co-assigned, co-pending U.S. Ser. No. 369,388, filed Apr. 19, 1982 of Klingensmith and Higgins. These are conventional isotactic polymers and may be illustrated by the below configuration:

R R R R R R R R I I where R is a regular isotactic polymer and I is an irregular atactic polymer. R is in a proportion to I of 95:5 and as can be seen, the R's and I's are not covalent bonded together. These polymers are accessible to extraction and thus, result in high ether soluble content. This polymer is referred to as Polymer III in the bar graph of FIG. 3 of this application.

Other elastomeric polybutylenes are disclosed in the following patents:

U.S. Pat. No. 3,175,999 to Natta et al (Bar Graph Polymer II) describes polymers of alpha olefins, primarily of propylene, which are designated "stereoisomer" block polymers. They are described as polymers in which isotactic sections alternate with non-isotactic (atactic) sections. Polymer II is illustrated below:

R R R R R R R R

I I I I I I I I where R is in a proportion of I of 50:50 and where R and I are not covalently bonded. These polymers, like those of Polymer type III, are accessible to extraction and thus result in high ether soluble content and leaching to food or the body. According to Natta, stereoisomer block polymers can be recovered in small amounts from conventionally prepared Ziegler-Natta homopolymers by a series of solvent extractions. In the illustrative examples, the catalysts are compositions which are now known to have poor or very poor stereoregulating ability. In Example 4 of the patent, a polymer of butene-1, produced with a catalyst prepared from vanadium tetrachloride and triethylaluminum, was extracted with hot ether and the residue of the ether extraction was then extracted with methylene chloride to obtain an extract, corresponding to 6% of the residue of the first extraction, which was said to have high reversible elasticity.

U.S. Pat. No. 4,298,722 to Collette et al is directed to production of an elastomeric polybutene-1 which is made with a poorly stereoregulating catalyst and has an ether solubles content of at least 30% and isotacticity not exceeding 50%. The patent also discloses blending the elastomeric polymers with 2–98% of highly isotactic poly(1-butene). Blends of less than 80% of the elastomeric polymer are said to be non-elastomeric and to exhibit improved impact properties. The patent illustrates impact improvement by adding 10–50% elastomeric polybutylene to a conventional isotactic polybutylene containing 25% carbon black.

Japanese Kokai Patent No. 54/85293, published July 6, 1979, applied for in Japan on Dec. 21, 1977 by Mitsui Petrochemical Industries Company, is directed to the production of certain copolymers of butene-1 with another alpha monoolefin, having more than 60 but no more than 98% weight butene-1 content and preferably 70–90% butene-1 content and 10–30% propylene. These copolymers are said to have physical characteristics comparable to polyvinyl chloride.

BRIEF DESCRIPTION OF THE DRAWING

FIG. 3 is a bar graph of Percent Sequential Extraction v. Polymer Types, including the polymer of this invention.

DETAILED DESCRIPTION OF THE INVENTION

Figure 1:
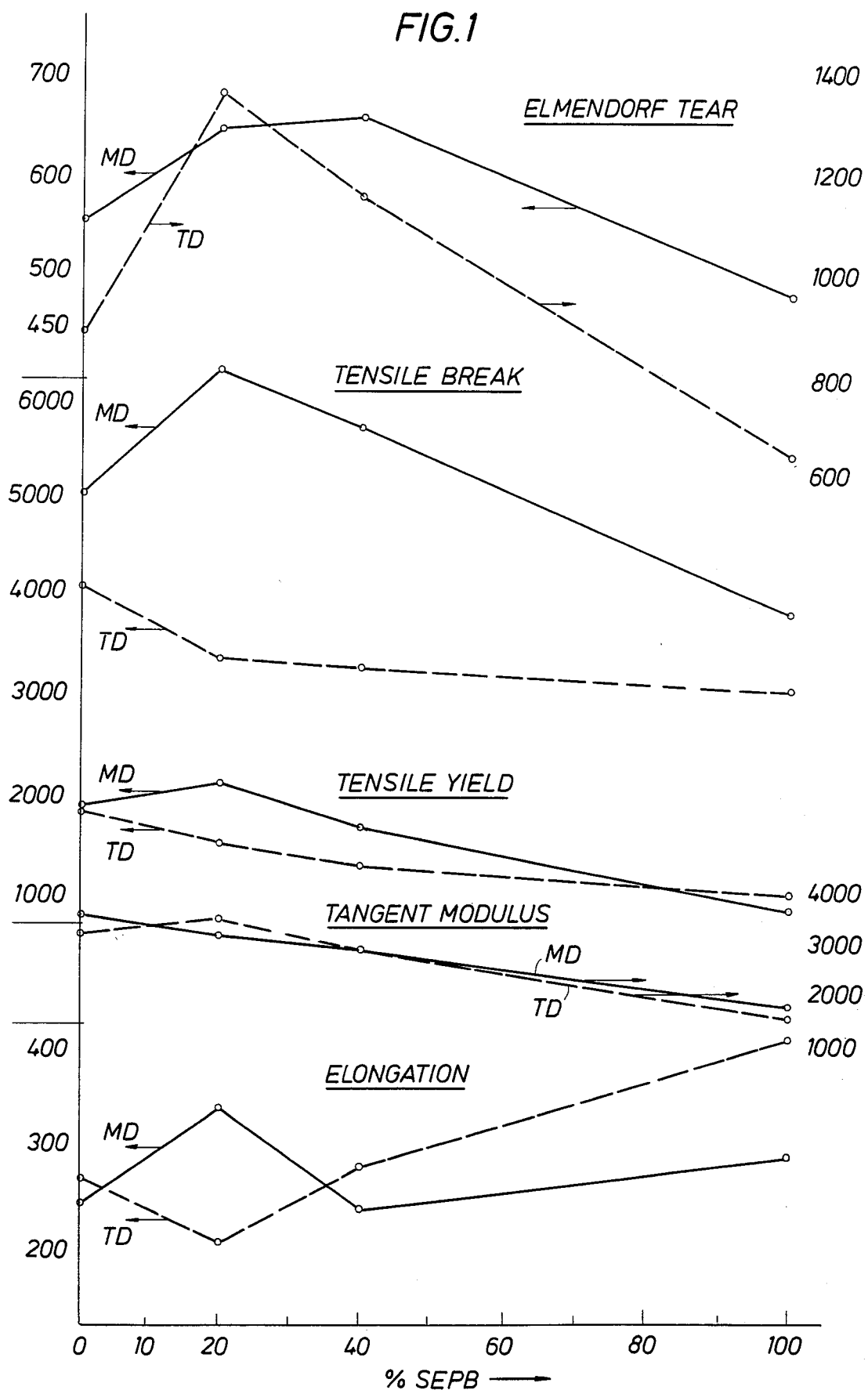
FIG. 1 is a plot of several mechanical properties of film compositions of this invention, illustrating the effect of increasing ratios of SEPB to PBE.

The conventional PBE copolymer used in the invention is suitably an isotactic thermoplastic butene-1-ethylene copolymer with a melt index of from about 0.1 to 4, preferably about 0.8 to 2.0 and more preferably about 0.9 to 1.1, as measured by ASTM D1238, Condition E. Melt indices and molecular weights of the butene-1-ethylene copolymers are inversely related; the corresponding molecular weight for a copolymer with a given melt index may be readily determined by routine experimentation. A particularly suitable copolymer, for example, has a melt index of about 1.0 and a weight average molecular weight (determined by gel permeation chromatography) of about 570,000. Suitable butene-1-ethylene copolymers contain from about 0.5 to 10 mole percent, preferably about 0.5 to 5 mole percent and more preferably about 1 to 2 mole percent of ethylene. Ethylene contents and densities of the butene-1-ethylene copolymers are also related; the corresponding density for a copolymer with a given ethylene content may also be determined by routine experimentation. A particularly suitable copolymer, for example, has an ethylene content of 1.5 mole percent and a density of 0.908 grams/cm$^3$. The term "isotactic" butene-1-ethylene copolymer, as used herein, refers to a copolymer containing at least 90%, preferably at least 95% and more preferably at least 98% by weight, of isotactic portions, determined as the diethyl ether insoluble component. Methods for preparing the copolymers are well known in the art. The preferred copolymers are commercially available. "PBE" refers to isotactic butene-1-ethylene copolymers of this type.

The preferred stereoregular elastomeric butene-1 polymers used in this invention are of the type described in U.S. patent application Ser. No. 369,388. The polymers suitably have number average molecular weights $M_n$ in the range from 20,000 to 300,000, preferably about 25,000, and an ether-extractible content less than 10%, preferably no more than 5% so as to be useful for medical and food packaging.

The elastomeric polybutylene described in Ser. No. 369,388 is a total product of the homopolymerization of butene-1, characterized by the following properties:

| | |
|---|---|
| Solubility in refluxing diethyl ether, % wt | less than 10 |
| Crystallinity, by X-ray diffraction (Form I), % | 25–40 |
| $M_n \times 10^{-3}$ | 20–300 |
| $M_w \times 10^{-3}$ | 150–2200 |
| $M_w/M_n$ | 4–8 |
| Melting Point, Form I, °C. | ~100–118 |
| Melting Point, Form II, °C. | ~98–110 |
| Tensile Strength | |
| At yield, psi | 400–1,700 |
| At break, psi | 3,000–4,500 |
| Elongation at break, % | 300–600 |
| Hardness, Shore A, 10 seconds | 50–90 |

In fractional crystallization method A, described below, the residue of the third recrystallization represents no more than about 25% of the total polymer.

METHOD A 100 grams of the total polymer is dissolved in 1 liter of n-heptane at 50°–60° C. The solution is cooled to ambient temperature of about 25° C. and allowed to stand for at least 24 hours, to permit complete precipitation of the polymer portion which is crystallizable at those conditions. The solid fraction is filtered off, washed with 1 liter of n-heptane, dried and weight. The soluble fraction is recovered from the combined filtrate and wash liquid by evaporation of the solvent and weight. The procedure is repeated with the total first precipitate and repeated twice more with the successive precipitates, using the same amount of n-heptane and the same conditions.

In the preferred products of this type, the total unextracted reaction product contains no more than 8%, and still more preferably no more than 5% of ether soluble components. The total polymerization products may be used without extraction or after extraction of all or a portion of the small ether-soluble fraction, which owes its solubility to a combination of low steric regularity and low molecular weight.

A prominent feature of this elastomeric polybutylene is its substantially suppressed level of crystallinity compared to conventional polybutylenes. A companion feature of the elastomeric polybutylene, one which makes it unique among the large number of polyolefins produced with stereoselective catalyst, is the fact that this suppression of crystallinity is achieved without a corresponding large increase in amount of easily extractable polymer (soluble in refluxing diethyl ether). This unusually low ether solubles content makes possible film use for medical and food packages that cannot tolerate substantial leaching of the plastic into the solutions or food.

Another distinguishing feature of the elastomeric polybutylene is its $^{13}$C NMR spectrum. The $^{13}$C NMR method provides detailed information about the configuration and conformation of short sections of polymer chains. A comparison $^{13}$C NMR spectra of conventional with said elastomeric polybutylene indicates a significant difference between the products, even though they both have a very high degree of steric order. The difference shows up as a higher proportion of polymer comprises of short sequences of frequent tactic inversion alternating with longer isotactic sequences. This indicates for the elastomeric polybutylene a molecular structure of relatively short average isotactic sequences, which contrasts strikingly with the structure of long average isotactic sequences of conventional polybutylene. The elastomeric polybutylene consists mainly of isotactic blocks, interrupted by inversions of only one or a few monomer units largely in alternating (syndiotactic) stereochemical configurations, as shown in the Polymer I configuration previously illustrated.

The preferred catalyst to be employed for production of the elastomeric polybutylene is one in which the solid component comprises a support of magnesium chloride in an active form, combined with an electron donor and titanium halide; typically the components are $MgCl_2$, $TiCl_4$ and an aromatic ester e.g., ethyl benzoate or p-ethyl toluate. This solid component is combined with an aluminum alkyl, typically a trialkylaluminum such as triethyl aluminum and a selectivity control agent, typically ethyl anisate. Numerous variants of these catalysts are described in recent patents, such as U.S. Pat. Nos. 4,051,313; 4,115,319; 4,224,181; 4,235,984 and 4,250,287. Preferred to date are catalysts prepared as described in U.S. Pat. No. 4,329,253 and European Patent Application No. 19,330, published Nov. 26, 1980.

Polypropylene suitable for use in blends of this invention is so-called isotactic propylene homopolymer. Commercially available polypropylenes with melt flows from about 1 to 10, as measured by ASTM D1238, Conditions L, are typically employed. A particularly suitable polypropylene, for example, has a melt flow of about 5, a weight average molecular weight (determined by gel permeation chromatography) of about 360,000 and a density of 0.902 grams/cm$^3$. A wide variety of suitable polypropylene are commercially available and methods for their preparation are well known in the art. A polypropylene with a viscosity at mixing temperatures approximating that of the butene-1-ethylene copolymer is preferred, in order to facilitate intimate mixing in conventional extrusion compounding equipment. This may be accomplished, for example, by blending butene-1-ethylene copolymer having a melt index of 1.0 (2.4 melt flow) with 5 melt flow polypropylene. "PP" refers to polypropylenes of the type described.

High density polyethylene suitable for use in compositions of this invention is characterized by a density above about 0.93 g/cc and about 0.1 to 20, as measured by ASTM D1238, Condition E, are typically employed; HDPE for higher melt index may also be suitable. A particularly suitable HDPE, for example, has a melt index of 0.45 g/10 min., a weight average molecular weight of about 166,000 and a density of 0.950 grams/cm$^3$. A high density polyethylene with a viscosity at mixing temperatures approximating that of the butene-1-ethylene copolymer facilitates intimate mixing in conventional extrusion compounding equipment. A wide variety of suitable high density polyethylene are commercially available and method for their preparation are well known in the art. "HDPE" refers to high density polyethylenes of the type described.

Polypropylene improves the processability of compositions of this invention. It is suitably employed in amounts of about 2% by weight to about 25% by weight of the total blend, preferably about 4% by weight to about 8% by weight, still more preferably about 6% by weight to about 8% by weight, and most preferably about 6% by weight. Polypropylene addition at certain levels within the range described may optimize certain properties but not others; the most preferred level of about 6% by weight polypropylene represents the level at which polypropylene-containing compositions exhibit the best overall improved property balance.

The benefit of HDPE incorporation in compositions consisting predominantly of conventional PBE is apparently due to a crystal nucleating effect. Only very small amounts of HDPE are required to provide the desired beneficial effects. If properly blended, the proportion of HDPE which provides the beneficial effects is in the range from about about 0.02% by weight to about 0.5% by weight; substantially the full beneficial effects can in some cases be obtained at concentrations below about 0.1% by weight; thus, amounts in the range of about 0.02 up to about 0.1 are often adequate; amounts in the range from about 0.05 to about 0.4, and more particularly from about 0.05 to about 0.25 will generally be sufficient. However, somewhat larger amounts, up to about 1.5% by weight about to 2% by weight may be required to obtain the full effect if the blending method is not highly effective.

HDPE of high molecular weight is not an effective crystallization nucleant for SEPB. Compounds which have been found to be effective nucleants are disclosed in co-assigned, co-pending Ser. No. 369,386, filed Apr. 19, 1982, of A. M. Chatterjee. They are HDPE of low molecular weight (850–3,000), stearamide, N,N'-ethylene-bisstearamide, 1-naphthalene acetamide, benzamide. Polypropylene also acts as a crystal nucleating agent in SEPB.

The method of combining PBE and/or SEPB with the other components of the blend can significantly affect the properties of the composition. For commercial utility, it is desired to use the least amount of energy to combine the components into an effective blend, i.e., a blend in which the HDPE is dispersed in the PBE, and not in the PP. Where HDPE and PP are employed, it is highly desirable to first incorporate the HDPE in PBE or SEPB, either by incorporating HDPE in a masterbatch to be added to the major portion of butene polymers prior to or together with PP, or by incorporating HDPE in the PBE or SEPB before PP is added. The principle to be observed is to avoid incorporation of HDPE in the PP, as would occur if a masterbatch of HDPE in PP were employed and as would occur at least in part if HDPE and PP were added simultaneously through a single side-arm extruder. For convenience of reference, blends prepared in this manner will be designated "intimate blends".

It may also be possible to prepare satisfactory films from compositions prepared by dry blending the components, employing relatively large proportions of HDPE within the overall range to make up for deficiency in its utilization.

If desired, various conventional fillers, thermal and ultraviolet stabilizers, processing agents, slip agents, antiblock agents, nucleating agents, pigments and/or other additives may be incorporated in the polymers before, during or after the blending operation. The effect of various additives on certain properties of the composition may or may not make their presence desirable, depending in part on the contemplated end use. For examle, the presence of certain slip agents, while desirable in compositions used for such products as compression wrap, may adversely affect the seal strength of the composition and may therefore be undesirable for use in certain other products, e.g., heavy duty medical bags, where seal strength is a primary consideration.

After blending, the compositions of the invention can be formed on conventional manufacturing equipment, e.g., blown film equipment. The compositions can be formed into a variety of shapes with cross-sectional thicknesses (gauge) of, for example, about 0.5 to 30 mils. Typical shapes include oriented or unoriented flat or tubular films or sheets which can be used for wrappings, bags, and packages for food and medical items. The compositions can be used as replacements for conventional LDPE and PBE/LDPE films or sheets in many applications. The superior overall property balance of the present compositions often makes possible a reduction in gauge of up to one-third or more over the corresponding LDPE products; gauge reduction serves to reduce processing times and the amount of material required per product, and is therefore economically desirable. However, even without such a reduction in gauge, the present compositions can be manufactured (processed) into film and the like at rates exceeding those for PBE/LDPE blends and, when cold air is blown on the bubble, at rates approaching those for LDPE itself. If the compositions are manufactured into film on conventional blown film machines, a blow up ratio (bubble diameter:die diameter) of from about 1.0 to 4.0, more preferably about 2.0 to 3.0, is typically employed. At present, a ratio of about 2.6 is preferred.

Persons skilled in the art of blown film production will realize that the results obtained with the blends of the invention, with conventional LDPE and with PBE/PP and PBE/LDPE blends are dependent on actual conditions of operation, equipment used and other factors, and can therefore vary considerably when the compositions are used in different equipment or at different conditions.

The preferred method of converting compositions of this invention is the manufacture of film or sheet by the blown film method. The compositions can be processed on equipment designed for manufacture of LDPE film, substantially in the same manner as prior commercial polybutylene film compositions. A description of the blown film process is given in the Kirk-Othmer reference and in Technical Bulletin SC:391-79 of Shell Chemical Company, cited above.

After manufacture (processing) into film and the like, compositions according to this invention can be fabricated into final products on conventional fabrication equipment, which can be of the in-line or out-of-line variety. With typical in-line equipment, which is more economical to use and used by a majority of the industry, a film is passed directly after its manufacture to the fabrication equipment, e.g, heat sealing machine, used for fabricating into a final product. With typical out-of-line equipment, a film is first stored and not passed directly to the fabrication stage; in the case of butene-1 polymers of this invention, the blown film is typically aged two to three days to allow for the crystalline transformation of the polymer from Form II to the more stable Form I. Heat sealing may be accomplished by conventional means, for example hot wire, bar and dielectric machines.

While heat sealing conditions will depend on various factors such as gauge (thickness) and the machine used, heat sealing temperature is generally about 225° to 650° F. All else being equal, the film from composition of this invention may be sealed at lower temperatures than conventional PBE/LDPE film, while affording products with excellent seal strength. This allows fabrication of the present compositions on existing industrial equipment adapted for use with LDPE films.

Figure 2:
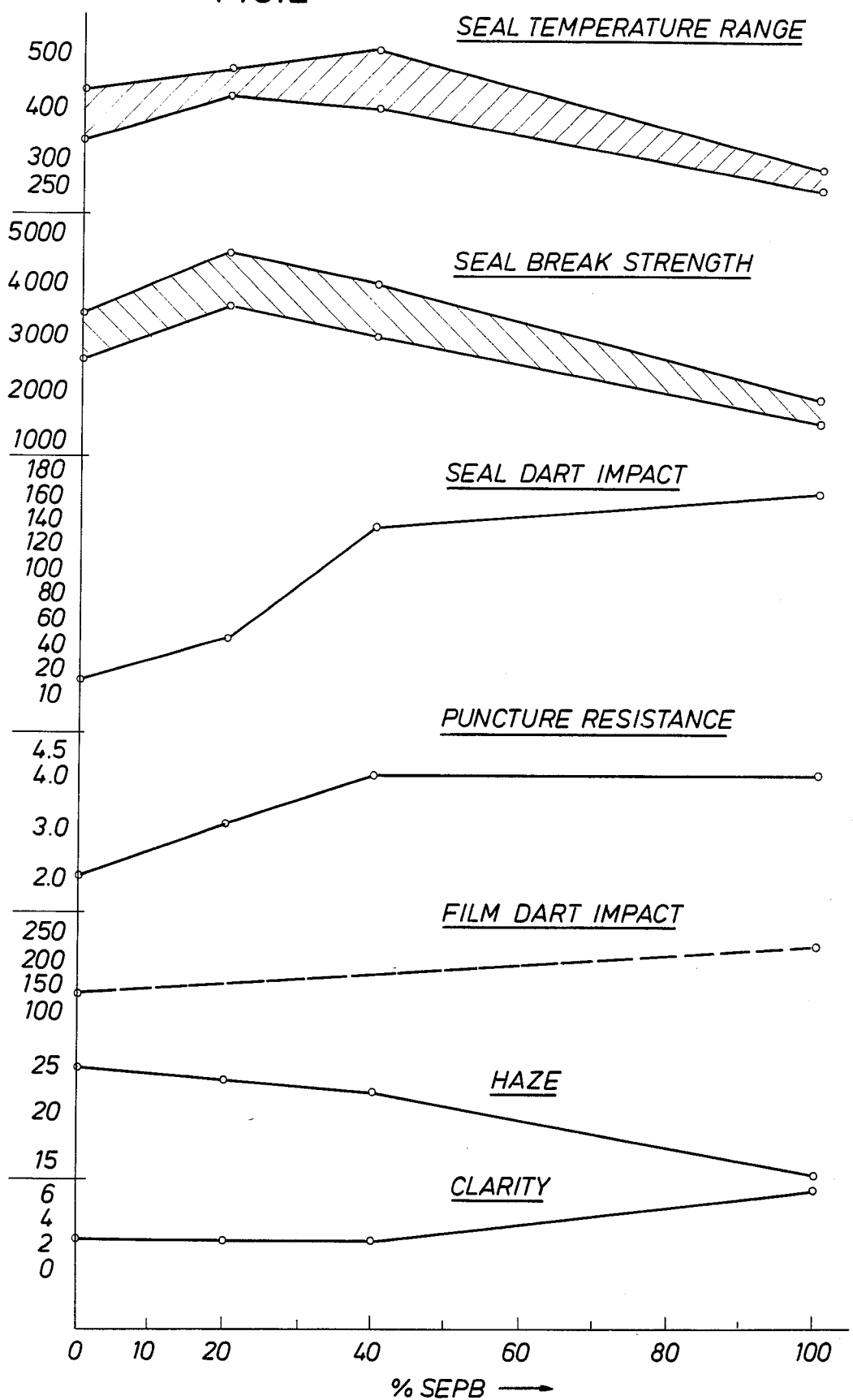
FIG. 2 is a plot of seal properties and of haze and clarity of film compositions of this invention, illustrating the effect of increasing ratios of SEPB to PBE.

A significant improvement in films made from compositions containing SEPB as sole butene-1 polymer or in combination with conventional PBE is in the strength of the film seal, and particularly in the impact resistance of the seal and the puncture resistance of the film, as illustrated by the examples and the date shown in FIGS. 1 and 2 of the drawing.

The compositions according to the invention which contain up to 50% by weight of SEPB also exhibit excellent tear strength. Tear strength is related in part to the rate (line speed) at which the material is processed; materials processed at higher rates typically exhibit decreased tear strengths. These compositions, even when processed at rates exceeding those for conventional PBE/LDPE and approaching those for conventional PBE/LDPE and approaching those for the conventional materials. The presence of up to 40-50% SEPB increases tear strength above that of compositions employing conventional PBE as sole butene-1 polymer. The tensile stress at break of the film itself is also higher for these compositions than for corresponding compositions containing conventional PBE as sole butene-1 polymer. In addition, the clarity of compositions according to this invention is improved over the clarity of conventional PBE/LDPE and approaches the clarity of LDPE.

The invention is illustrated further in the following examples, which are not to be construed as limiting its scope. In the examples, the materials tested are denoted as follows:

PBE/PP—blend of conventional butene-1-ethylene copolymer (1.5 mole % ethylene, 1.0 melt index, 98% isotactic, 0.908 g/cm$^3$); 6% by weight propylene homopolymer (5 melt flow, 0.902 g/cm$^3$, wt. av. molecular weight of 360,000); and minor amounts of fatty acid amide slip agent, silica antiblock agent and hindered phenolic thermaloxidative stabilizer;

PBE/PP/HDPE—the above blend PBE/PP with 0.56% by weight of high density polyethylene (commercial product, 0.45 melt index, 0.950 g/cm$^3$);

PBE/LDPE—blend of conventional butene-1-ethylene copolymer (as above); 8% by weight low density polyethylene (2.1 melt index, 0.924 g/cm$^3$); and minor amounts of slip agent, antiblock agent and stabilizer (as above);

SEPB/PP/HDPE—blend of stereoregular elastomeric butene-1 homopolymer (described below); 6.5% by weight propylene homopolymer (as above); 0.56% by weight high density polyethylene; and minor amounts of fatty acid amide slip agent, silica antiblock agent, and hindered phenolic thermal-oxidative stabilizers;

PBE/SEPB/PP/HDPE—blends of various proportions of PBE and SEPB with 6.5% by weight PP, 0.56% by weight HDPE and slip agent, antiblock agent and stabilizer (as above).

LDPE—low density polyethylene (as above) and minor amounts of antiblock agent and thermaloxidative stabilizer.

LLDPE—linear low density polyethylene (1.0 melt index, 0.920 g/cm$^3$) and minor amounts of slip agent, antiblock agent and stabilizer (as above).

LDPE and LLDPE and HDPE were commercial products whose properties, given above, are those reported by the manufacturer.

The melt index and melt flow of PBE, SEPB and PP were measure by ASTM D1238, Conditions E and L, respectively.

PP and PBE also were commercial products. The elastomeric polybutylene was an experimentally prepared product which had the following properties:

| | |
|---|---|
| Solubility in refluxing diethyl ether, % by weight | 5.7 |
| Melt Index, g/10 min. | 1.99 |
| Melting point, °C. (DSC, 10° C./min) (Form II) | 104.5 |
| Tensile Strength, psi | |
| at yield | 740 |
| at break | 3420 |
| Elongation at break, % | 470 |
| Crystallinity, by x-ray diffraction (Form I), % | 35.5 |
| Crystallization temperature, °C. | 35 |

FIG. 3, shows a bar graph of Percent Sequential Extraction v. Polymer Type, including the polymer of this invention. This bar graph is based on sequential extraction of three polymers: one is a conventional commercial isotactic polybutylene (Type III); the second, produced by polymerization with a catalyst system of TiCl$_3$ and aluminum triethyl, is considered to be similar to those of Frese et al and Collette in that it contains a substantial ether-extractable non-isotactic component (Type II); the third polymer is a homopolymer of butene-1 having the characteristics of the elastomeric polymers employed in the present invention in which the irregularities are enchained such that there is no substantial ether extractable component (Type I). The several fractions of the polymers were analyzed by nuclear magnetic resonance (nmr). The numbers shown in each component of the bar graph correspond to the average length of uninterrupted isotactic sequences in the polymer. The following differences are observed from these bar graphs:

The conventional isotactic polybutylene (Type III) has a strictly bimodal distribution in which about 88% has large uninterrupted isotacticity sequences (numbers above 40) and the remainder very short isotactic sequences (numbers less than 5).

The elastomer produced with a catalytic system which results in a high atactic component (Type II) also has a bimodal distribution. In this case the high isotactic sequence component comprises only 18% of the polymer and the remainder has a sequence length less than 6, including 28% between 5 and 6 and 54% at no more than 3.5.

By contrast, the stereoregular elastomeric polymer of butene, such as that to which the claims are now limited (Type I), contains only a trace of material of relatively long isotacticity sequence length (over 30) but contains instead a substantial continuity of relatively equal-sized components decreasing in sequence length from about 21 to about 13, about 9, about 7 and so on down to 3.

The seal strength (tensile stress of seal at break) was measured by sealing two strips of film to each other and subjecting to tension perpendicular to the seal (ASTM D882) until a break occurred. The tear strength (Elmendorf tear) was measured by ASTM D1922. The impact strength of the seal (dart drop) was measure by ASTM D1709, Method A (50% of failure). The tensile stress at break of the film was measure by ASTM D882. The blends were manufacture into film using cold air blown on the bubble exiting from the blown film die.

EXAMPLE 1

The series of experiments recorded in Table I demonstrates the significantly improved seal strength of the compositions of this invention compared to conventional butene-ethylene copolymer. For comparison purposes, properties are also shown for films made from conventional LDPE and LLDPE.

The PBE/PP blend, containing 6% PP, was prepared on commercial scale equipment. The other blends were prepared from two masterbatches. The additives package for the blends containing PP was made into PP masterbatch with a Banbury type mixer. HDPE was added via a Banbury prepared masterbatch with PBE. The two masterbatches were dry blended with PBE at 11:1 letdown ratio and thereafter compounded on a 3½" Welex extruder.

All films were fabricated from a 1¼ Brabender extruder with a die having 0.40" gap and 2" diameter. The melt temperature for PBE/PP and PBE/PP/HDPE was about 210° C. The processing conditions employed during the fabrication of LDPE film were as recommended by resin suppliers.

The data in Table I demonstrate that by blending the stereoregular elastomeric butene-1 homopolymer into the conventional butene-1-ethylene copolymer, the seal impact strength and puncture resistance of the blown film are much improved (e.g., PBE/PP versus (PBE/PP)/SEPB=60/40) and the two properties are comparable to the competing resins (LDPE and LLDPE). Most importantly, the other mechanical properties of the blend remain essentially the same as those of the conventional butene-ethylene copolymer (PBE/PP) blend. Table I also indicates that the stereoregular elastomeric butene-1 homopolymer (SEPB/PP/HDPE) exhibits much greater film and seal dart impact strengths than the conventional butene-1-ethylene copolymer. Also, better optical properties and lower sealing temperature are found for the stereoregular elastomeric butene-1 homopolymer.

These properties, combined with the unusually low percent ether solubles obtained (5.7%), makes the composition and film of this invention exceptionally suited for use in food and medical packaging.

TABLE I

| | PROPERTY COMPARISON OF BLOWN FILMS* | | | | | |
|---|---|---|---|---|---|---|
| | PBE/PP | PBE/PP - 60% SEPB - 20% | PBE/PP - 60% SEPB - 20% | SEPB/PP/HDPE | LDPE | LLDPE |
| Mechanical Properties | | | | | | |
| Elmendorf Tear MD | 556 | 652 | 667 | 483 | 38 | 489 |
| g/mil TD | 847 | 1,371 | 1,166 | 650 | 104 | 594 |
| Tensile Break MD | 5,030 | 6,380 | 5,750 | 3,850 | 2,880 | 4,880 |
| psi TD | 4,130 | 3,400 | 3,730 | 3,140 | 3,280 | 4,510 |
| Yield Strength MD | 1,950 | 2,170 | 1,780 | 930 | 1,340 | 1,500 |
| psi TD | 1,910 | 1,950 | 1,400 | 1,020 | 1,440 | 1,490 |
| % Elongation MD | 245 | 345 | 243 | 299 | 348 | 772 |
| TD | 272 | 211 | 289 | 417 | 497 | 729 |
| Film Dart Impact, 26" f 50, g/mil | 145 | | | 240 | | 115 |
| Tangent Modulus MD | | 34,100 | 31,090 | | 39,300 | |
| psi TD | | 35,600 | 30,800 | | 45,700 | |
| Secant Modulus MD | 36,040 | | | 19,580 | | 28,160 |
| psi TD | 33,760 | | | 18,540 | | 30,620 |
| Puncture Resistance with ½" Dia. Head @ 20"/min., in-lb/mil | 2.09 | 3.11 | 4.13 | 4.23 | 2.62 | 4.47 |
| Sealability | | | | | | |
| Seal dart Impact, 26" f 50, g/mil | 10 | 43 | 138 | 175 | | 130 |
| Seal Temperature, F.° Range (Avg. Gauge) | 360–450 (~2.75 mil) | 440–500 (~2.4 mil) | 420–520 (~2.7 mil) | 270–310 (~2.0 mil) | 400–520 | (~3.5 mil) |

TABLE I-continued

PROPERTY COMPARISON OF BLOWN FILMS*

|  | PBE/PP | PBE/PP - 60% SEPB - 20% | PBE/PP - 60% SEPB - 20% | SEPB/PP/HDPE | LDPE | LLDPE |
|---|---|---|---|---|---|---|
| Seal Break Strength, psi | 2,700–3,600 | 3,680–4,700 | 3,120–4,220 | 1,650–2,050 |  | 1,500–2,100 |
| Optical | | | | | | |
| Haze, % | 25 | 24 | 23 | 15 | 13.3 | 16 |
| Clarity, % | 2.5 | 2.4 | 2.4 | 7.1 | 1.2 | 27.7 |
| Processability | | | | | | |
| Film Gauge, mil | 2–3.5 | 1.8–3.0 | 1.8–3.6 | 1.5–2.4 | 2–3 | 3–4 |
| Blow-Up Ratio | 2.0 | 2.0 | 2.0 | 2.0 | 1.9 | 1.9 |

*All properties were from the films fabricated with a 1¼" small Blown Film line with a 2" die.

EXAMPLE 2

A SEPB butene-1/propylene copolymer of 10.4% mole propylene content was compounded with 14.7%wt PP and 1.0%wt HDPE and compared to 100% vinyl shower curtain material. The blend formulation containing SEPB copolymer, polypropylene and a dual nucleant masterbatch concentrate of HDPE and stearamide in butene-1 polymer was compounded in a Brabender extruder. This intensive mixing screw was coupled with a 100-mesh screen pack to provide intensive mixing requirements prior to strand pelletizing.

Films were prepared on a cast film line with a casting die preset at 1½ mil thickness. Therefore variations in film thickness were controlled by varying line takeoff conditions. Physical properties, formulation and cast film extrusion conditions are shown in Table 2.

Tensile and elongation property data indicate the SEPB compound is comparable to the 100% vinyl shower curtain. Both reflect a balanced property system between the MD (machine direction) and TD (transverse direction) of the case films. However, the SEPB compound is significantly stiffer (less flexible) than the vinyl control.

TABLE 2

| TEST | TENSILE YIELD, PSI | | TENSILE @ BREAK, PSI | | ELONGATION @ BREAK, % | |
|---|---|---|---|---|---|---|
|  | MD | TD | MD | TD | MD | TD |
| Cast Film | | | | | | |
| SEPB Composition @ 2–3 mil | 1010 | 850 | 2800 | 2360 | 325 | 440 |
| SEPB Composition @ 6–9 mil | 910 | 880 | 3670 | 2780 | 540 | 510 |
| SEPB Composition @ 16–21 mil | 1040 | 950 | 3110 | 3030 | 510 | 520 |
| Control Vinyl Composition[1] @ 5–6 mil | 1310 | 1140 | 4010 | 3310 | 275 | 295 |

| TEST | STIFFNESS, PSI | HARDNESS SHORE. A (10 SEC.) | CLARITY |
|---|---|---|---|
| Compression-molded Plaque | | | |
| SEPB Composition | 3,280 | 86 | Opaque |
| Control Vinyl Composition | 750 | 85 | Transparent |

| COMPOUND FORMULATION | |
|---|---|
| INGREDIENTS | % w |
| SEPB Copolymer substrate (10.4% mole propylene) | 80.95 |
| Masterbatch No. 1 | |
| Polypropylene | 5.66 |
| Silica antiblock agent | 0.26 |
| Fatty acid amide slip agent | 0.07 |
| Oxidative stabilizer | 0.06 |
| Polypropylene | 9.00 |
| Masterbatch No. 2 | |
| Stearamide | 0.40 |
| HDPE | 1.00 |
| Polybutylene | 2.60 |
| TOTAL | 100.00 |

FILM CASTING LINE CONDITIONS
EXTRUDER ZONE TEMPERATURE:
No. 1 @ 190, No. 2 @ 200, No. 3 @ 210, No. 4 @ 210

| EXTRUDER, RPM | FILM THICKNESS, mil | FILM WIDTH, inches |
|---|---|---|
| 15 | 3 | 3 |
| 25 | 5 | 3½ |
| 83 | 8 | 5 |
| 110 | 20 | 5½ |

Batch Circulation Water, °C. = 10.
Casting Die = 6 inches set @ 1½ mil opening.
[1]Material was from the end user - Hygiene Industries, New York, N.Y. Trade name = H.M.S. Shower Curtain Liner.

What is claimed is:

1. A film or sheet forming composition consisting essentially of a blend of about 50 to 95% by weight of an isotactic copolymer of butene-1 and ethylene containing from about 0.5 to 10 mole percent ethylene and from 50 to 5% by weight of a stereoregular elastomeric polymer of butene-1 which has by the following properties:

Solubility in refluxing ethyl ether (ether solubles): 2–6%
Crystallinity: 25–40%
Melting point, Form I: 110°–118° C.
Melting point, Form II: 98°–110° C.
Tensile strength at break, psi: 3,000–4,500
isotacticity: 71–80%
block lengths: <25

2. A composition according to claim 1, containing from about 2% by weight to about 9% by weight of isotactic polypropylene.

3. A compositions according to claim 1, containing from about 2% by weight to about 9% by weight of isotactic polypropylene and from about 0.02% by weight to about 1.5% by weight of high density polyethylene.

4. A composition according to claims 1, 2 or 3 wherein the content of said elastomeric polymer is from about 10% by weight to about 30% by weight.

5. A heat sealable film or sheet prepared from a composition according to claim 1.

6. A heat sealable film or sheet prepared from a composition according to claim 2.

7. A heat sealable film or sheet prepared from a composition according to claim 3.

8. A heat sealable film or sheet prepared from a composition according to claim 4.

9. A film or sheet forming composition consisting essentially of a blend of about 50 to 95 percent by weight of an isotactic copolymer of butene-1 and ethylene containing from about 0.5 to 10 mole percent ethylene and from 50 to 5 percent by weight of the stereoregular elastomeric polymer of butene-1 which has by the following properties:

solubility in refluxing ethyl ether (ether-solubles): 3–5%
crystallinity: 25–40%
melting point, Form I: 110°–118° C.,
melting point Form II: 98°–110° C.
tensile strength at break, psi: 3,000–4,500
isotacticity: 71–80%
block lengths: <25.

10. A film or sheet forming composition consisting essentially of a blend of about 50 to 95 percent by weight of an isotactic copolymer of butene-1 and ethylene containing from about 0.5 to 10 mole percent ethylene and from 50 to 5 percent by weight of the stereoregular elastomeric polymer of butene-1 which has by the following properties:

solubility in refluxing ethyl ether (ether-solubles) about: 5%
crystallinity: 25–40%
melting point, Form I: 110°–118° C.,
melting point Form II: 98°–110° C.
tensile strength at break, psi: 3,000–4,500
isotacticity: 71–80%
block lengths: <25.

* * * * *